Jan. 26, 1943.  W. MAHLER  2,309,127
SLICING MACHINE
Filed Dec. 14, 1939  3 Sheets-Sheet 3
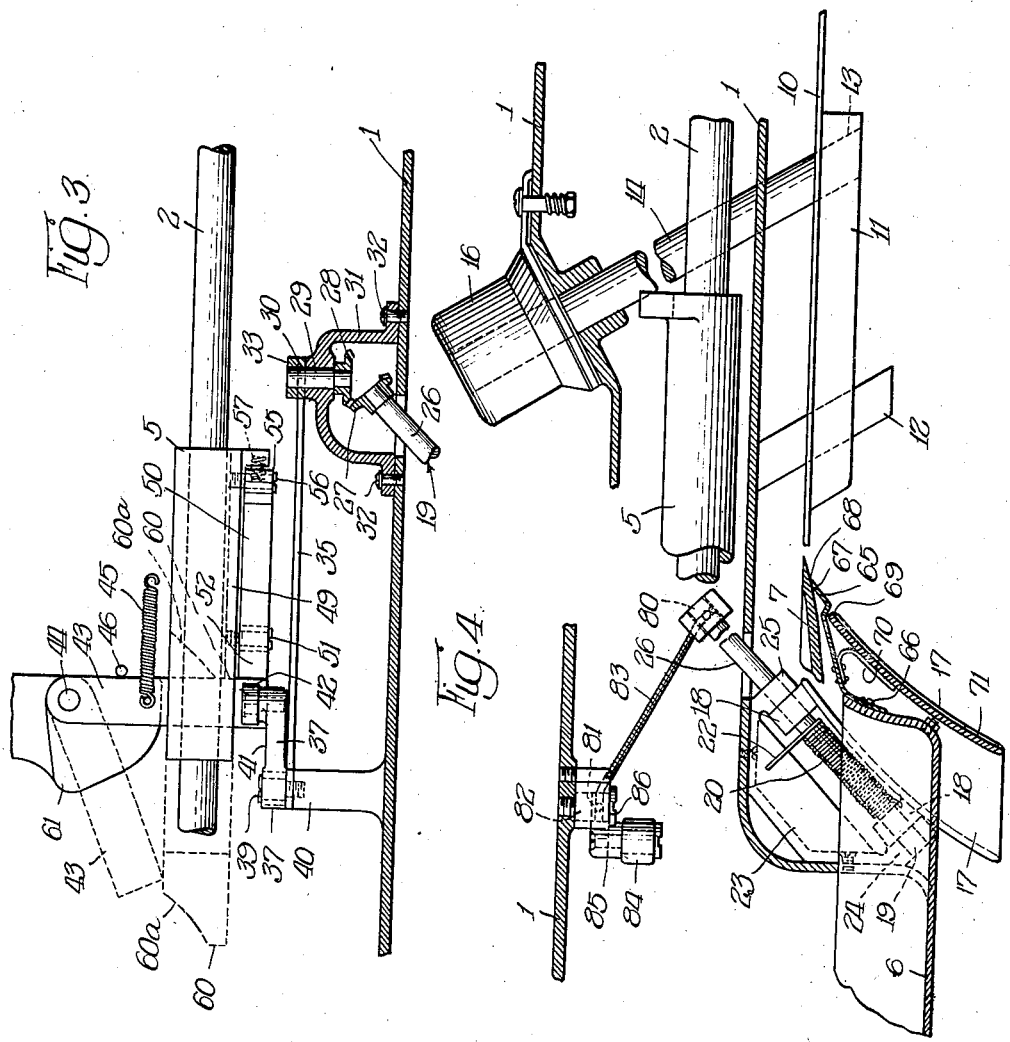
INVENTOR.
William Mahler,
BY John A. Marzall
ATTORNEY.

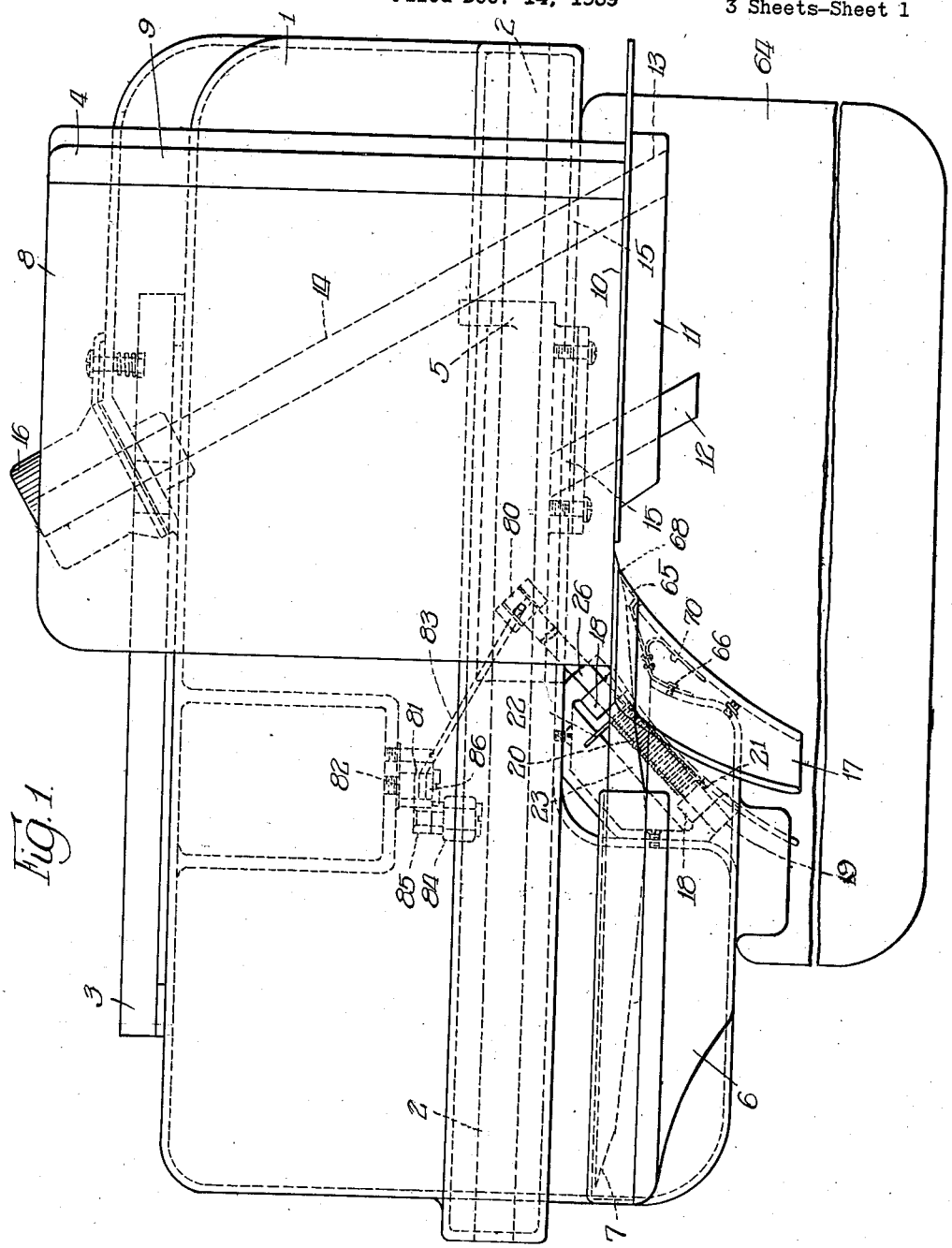

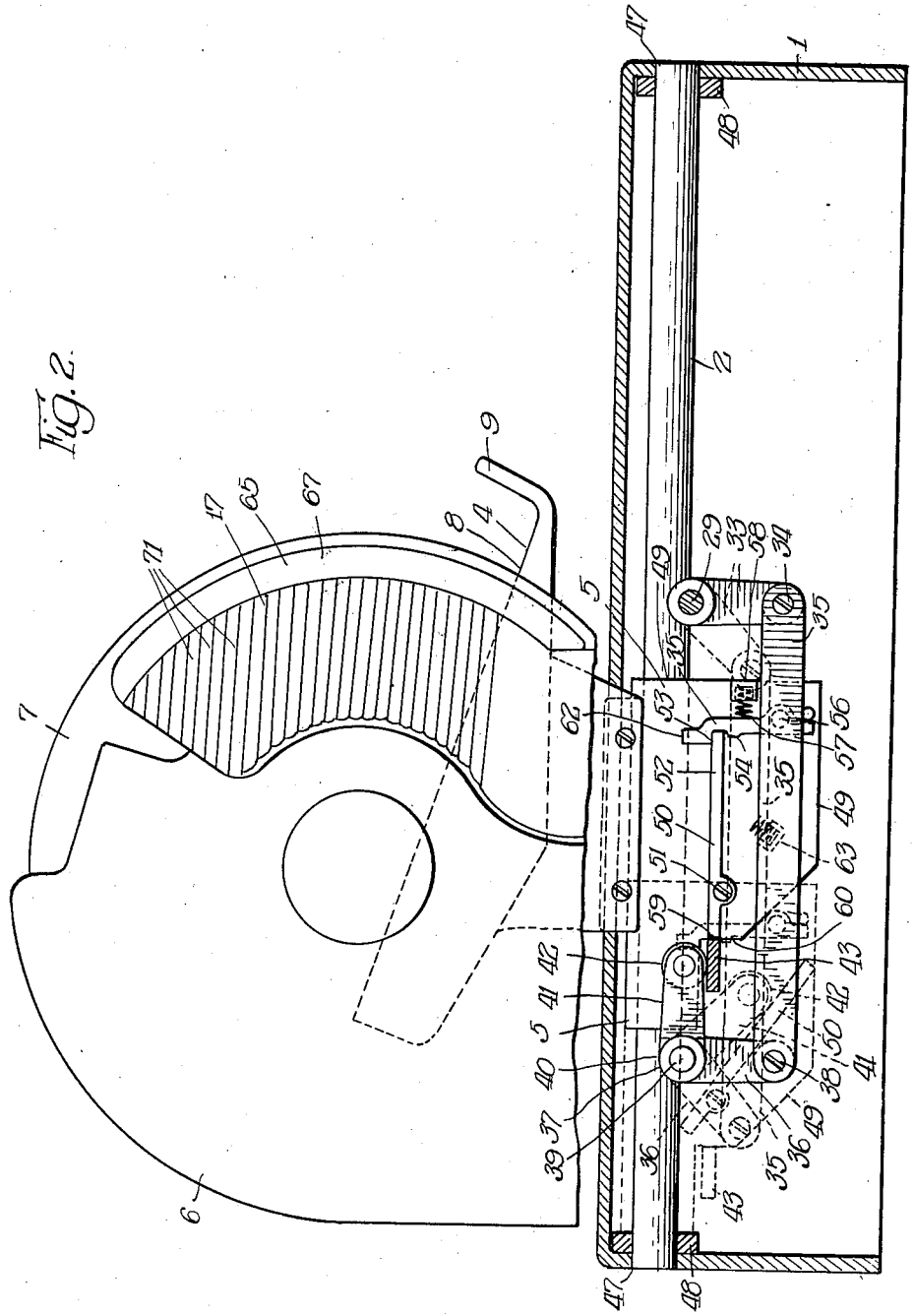

Patented Jan. 26, 1943

2,309,127

UNITED STATES PATENT OFFICE 2,309,127

SLICING MACHINE

William Mahler, La Porte, Ind., assignor to U. S. Slicing Machine Company, La Porte, Ind., a corporation of Indiana Application December 14, 1939, Serial No. 309,287

7 Claims. (Cl. 146—94)

This invention relates to slicing machines in general and particularly, although not exclusively, to slicing machines of the "push-pull" type. More specifically the invention relates to means for discharging slices of substance after they are cut by the knife.

The primary object of the invention is the provision of new and improved means for deflecting and stacking slices immediately after being cut, there being novel means for effecting the operation of the deflector shield or stacker element immediately after a slice has been cut and the carriage has reached a predetermined position.

Another important object of the invention is the provision of a stacker or fly wheel element which is located immediately adjacent the knife and which is in contact with the slice as it is being cut, there being means for effecting the whipping action of the fly or shield element immediately after a slice has been severed from the substance, whereby the slice will be deflected flat side down and subsequent slices will be arranged in stack relationship.

Another object of the invention is the provision of tripping mechanism for operating the deflector shield, the tripping mechanism being controlled by the carriage and operated when the carriage assumes a predetermined position and returned to normal locked or operating position when the carriage is returned.

A further object of the invention is the provision of a slicing machine which has a pivotally mounted stacker element or deflector shield arranged immediately adjacent the slicing knife and given a downward angular movement immediately after a slice has been cut and when the carriage has neared the end of its forward travel, so that the slice, immediately after being severed, is forced downwardly and away from the knife with a fast whipping action preventing the slice from curling or falling off the stacker shield during the cutting operation and then finally depositing the several slices on a slice tray in stacked position.

A still further object of the invention is the provision of a fly shield or stacker element which is so constructed and arranged to support the slice as it is being severed and then immediately after it is severed to throw the slice with a snap or whipping action on a slice receiving tray.

Still another object of the invention is the provision of a slicing machine, which has its parts arranged in a particular manner, which is strong and durable in construction, which is efficient in operation, and which is not likely to get out of order.

Numerous other objects and advantages will be apparent throughout the progress of the following specification.

The accompanying drawings illustrate a selected embodiment of the invention and the views therein are as follows:

Fig. 1 is a detail plan view of a slicing machine and embodying the invention.

Fig. 2 is a detail longitudinal sectional view, partly in elevation.

Fig. 3 is a detail vertical sectional view showing some of the deflector shield tripping mechanism.

Fig. 4 is a detail fragmentary plan section showing the deflector and associated mechanism of the machine.

The particular slicing machine herein shown for the purpose of illustrating the invention is the type of machine ordinarily known as the "push-pull" type, although the invention is applicable to the fully automatic type of machine as well. The slicing machine base 1 has operatively mounted thereon a longitudinal slide bar 2, Fig. 2, and a supporting rail 3, Fig. 1, upon which a carriage 4 is slidably mounted for to-and-fro reciprocal movement. The carriage 4 has rigidly secured thereto a slide bracket 5 which is freely slidable on the slide bar 2, Fig. 2. A knife support bracket 6 is rigidly secured to the frame or base 1 and supports a rotatively mounted circular knife 7. The carriage 4 includes a food support or substance table 8, Fig. 1, upon which substance is supported to be cut into slices by the knife 7. The substance is arranged against a shelf or flange 9 on the table 8, and the substance is adapted to be fed manually or by a food pusher (not shown) against a gauge plate 10.

The gauge plate 10 is mounted on a bracket 11, Figs. 1 and 4, being guided on a pin 12 and on the end 13 of a screw shaft 14. The pin 12 and the shaft end 13 are guided in separate bearings 15 in the machine base. An index knob 16 on the shaft 14, Figs. 1 and 4, is adapted to be manually manipulated to rotate the screw shaft 14 and consequently move the gauge plate in the direction of the axes of the pin 12 and the shaft 14. The knife 7 is rotated by a suitable motor drive and, as shown in the present embodiment, operates independently of the manually operated substance table 4.

A deflector shield or fly 17, for deflecting cut slices away from the knife, is mounted closely to one side of the knife, as clearly shown in Figs. 1, 2 and 4. The bottom end 18 of the deflector shield 17 is fastened to a pivot pin 19, Figs. 1 and 4. A spring 20 surrounds the pin 19 and has one end 21 thereof fastened to the deflector shield 17 and its other end 22 fastened to a stationary bracket 23. The pivot pin 19 is journaled in bearings 24 and 25 which are integral with the bracket 23, Fig. 4.

The pin 19 is provided with an extension 26, Figs. 2, 3 and 4, upon which there is mounted a beveled pinion 27, Fig. 3. The pinion 27 is adapted to mesh with another beveled pinion 28 mounted on a shaft 29 which is journaled in bearing 30 of a bracket member 31. The bracket member 31 is suitably fastened by screws 32, Fig. 3, to a rigid part of the machine frame 1. A lever 33, Figs. 2 and 3, is fastened to the pinion shaft 29 and is connected by a pin 34 to one end of a connecting rod 35, Fig. 2. The connecting rod 35 has its other end connected to the leg 36 of a bell crank 37 by a connecting pin 38. The bell crank 37 is fastened by a pivot screw 39 to a lug 40 on a stationary part of the slicing machine frame or base 1. The arm 41 of the bell crank 37 carries a roller 42 which rests upon a supporting bar 43, Figs. 2 and 3. The supporting bar 43 is pivoted on a pin 44, Fig. 3, being urged in a predetermined direction by a spring 45. A stop 46 is provided for holding the bar 43 in the position shown in Fig. 3. The stop 46 is adapted to be fastened on any stationary object or part of the base 1.

The substance table 4 is fastened to the slide bearing 5 and is adapted to slide on the rod 2 for manual reciprocation of the table. The slide bar 2 is fastened to the base 1 at opposite ends as indicated at 47, Fig. 2, there being resilient bumpers 48 provided at each of the ends of the rod 2 for limiting the fore and aft movement of the carriage 4. The slide bearing 5 has an extension flange 49, Fig. 2, and carries a pivot bracket 50 which is pivoted to the extension flange 49 by a pivot screw 51. The right hand end 52 of the pivot bracket 50 is adapted to be latched between projections 53 and 54 of a latch 55 which is pivoted at 56 to the extension flange 49. The latch 55 is spring pressed by a spring 57 which urges the latch 55 toward the end of the pivot bracket 50. The spring 57 is arranged in a socket member 58 formed in the slide bearing flange 49, Fig. 2.

When the carriage is moved in a forward direction towards slicing position, the edge 59 of the pivot bracket 50 on extension 49 of slide bearing 5 will contact and engage the supporting bar 43 and cause the bar 43 to become displaced and moved to the position shown in dotted lines in Fig. 3. The slide bearing 5 has a vertical abutment face 60 which is substantially in line with the edge 59 of the pivot bracket 50. This face 60 is wide enough vertically to abut against the side of a supporting bar 43. Also, this abutment face 60 is positioned far enough horizontally towards the pivot pin 44 so as to stay in contact with the side of the supporting bar 43 when the end of the slide bearing 5 engages the end bumper 48. The abutment face 60 is inclined as shown at 60a so as to shift the supporting bar 43 from one position to another. Furthermore, the inclination permits the parts to return gradually to normal position, preventing any clashing of the parts. The supporting bar 43 is braced underneath by the segmental bracket 61 and is maintained in its displaced position by resting upon the segmental bracket. This bracket 61 is rigidly secured to a stationary part of the frame. The pivot 44 of the supporting bar 43 also may be suitably fastened to the segment bracket 61 as desired.

When the carriage has been moved to slicing position, the parts carried by the extension flange 49 will be moved from the position shown in full lines to the position shown in dotted lines in Fig. 2 (to the left). As shown in dotted lines in Fig. 2, the roller 42 on the bell crank 37 has rolled over the surface of the pivot bracket 50 and has tripped this bracket 50 by tripping the latch 55 when it engaged the face 62 of the latch member 55. This engagement with the face 62 has caused the latch member 55 to be swung on its pivot 56 and released from its position between the projections 53 and 54 on the latch member 55. The pivot bracket 50 has dropped downwardly and come to rest on the spring support 63. When the pivot bracket 50 was released, the roller 42 on the bell crank 36 followed the inclination of the pivot bracket 50 causing connecting rod 35 to be given longitudinal motion, (toward the left, Fig. 2). The arm 33, beveled gear shaft 29, beveled gears 28 and 27 and pivot pin 19 have been given a corresponding motion because of the force of the spring 20. As soon as the parts have been so moved, the deflector shield 17 is forced away from the knife and the knife bracket, and the deflector shield is given a whipping action downwardly toward the slice receiving tray 64, Fig. 1. Such whipping action of the deflector shield 17 is transmitted to successive slices as they are cut, and the slices are stacked one upon another on the slice receiving tray 64. The simultaneous action of the parts just described takes place at the end of the forward travel of the carriage just as a slice has been severed from the substance against flange 9.

As the carriage is returned to normal starting position toward the operator, the parts carried by the extension flange will move to the right, Fig. 2, from the position shown in dotted lines in that figure to the position shown in full lines. The spring 45 is of sufficient strength to pull the supporting bar 43 back against the stop 46. Thus, as the carriage returns, the pivot bracket 50 will be returned to its normal position as shown in full lines in Fig. 2, and the link 35 and the other operating parts associated therewith will return to normal position. After every complete reciprocation of the carriage, the parts will be tripped and restored and slices will be piled on the slice tray 64.

A ramp 65, Figs. 1 and 4, may be fastened to the knife bracket 6 by means of screws 66. The guiding face 67 of the ramp extends between the edge 68 of the knife, Fig. 4, and the edge 69 of the deflector shield 17. This ramp 67 guides the slices away from the knife 7 and on the deflector shield 17. The deflector shield edge 69 lies slightly lower than the edge 67 of the ramp 65 so as to allow the slices to travel unobstructedly from the slab of substance over the knife and ramp and on the deflector shield 17. A spring stop member 70, Fig. 4, may be fastened to the ramp member 65 and arranged in position to be engaged by the deflector shield 17 so that the shield 17 will be resiliently stopped when the parts come to rest.

The deflector shield 17 may be provided with guide ribs or equivalent guides 71 which support each slice and let it follow the ribs or ridges as a track until the deflector shield is whipped to discharge the cut slice on the receiving tray 64.

The successive slices will be stacked one upon the other consecutively as they are being severed.

The invention provides a slicing machine which is provided with new and novel means located immediately adjacent the slicing knife for effecting a whipping action on the slice immediately after it is severed, the slice being discharged flat side down on a slice receiving table. The movement of the carriage causes spring tensioned tripping mechanism to effect the whipping action of the slice deflector shield, which action is correspondingly transmitted to the successive cut slices. The slice deflector shield acts in the nature of a discharge fly and it is operated by simple mechanical means controlled by the movement of the carriage. The mechanism is caused to be operated immediately at the conclusion of a slicing operation as the carriage is at the end of its forward or slicing stroke.

There are numerous ways in which the deflector shield or stacker element 17 may be operated with a whipping action and one other way in addition to that previously described is also shown in the drawings in Figs. 1 and 4. This additional way of operating the deflector shield may comprise the attachment of a lever arm 80 to the end of the shaft 26. A second lever arm 81 may be fastened to the screw pin 82. Each lever arm 80 and 81 has a universal ball joint (not shown) at their bottoms, which may be connected by a bar 83. A lever arm 84 may be fastened on a pivot pin which may be secured to a suitable stationary part of the machine frame. The side 85 of the lever arm 84 may be connected to the ball joint of the lever arm 81, and the side 85 of the lever arm 84 is adapted to make contact with the lug shown on the extreme right hand end of the slide bearing 5 when the meat table has been pushed to its extreme left hand position. The contact between the lug on the slide bearing 5 and the lever arm 84 is adapted to pull the connecting rod 83 towards the left and give the knife shield 17 a whipping slice depositing action.

Changes may be made in the form, construction and arrangement of parts without departing from the spirit of the invention or sacrificing any of its advantages and the right is hereby reserved to make all such changes as fairly fall within the scope of the following claims.

The invention is hereby claimed as follows:

1. A slicing machine comprising a slicing knife and means to rotate the knife, a carriage mounted on one side of the knife for movement in a rectilinear path across the slicing plane of the knife to cut slices from substance on the carriage, a slice receiving tray adjacent the knife, a pivotally mounted deflector and stacker element arranged at the other side of knife and adjacent thereto, spring means normally urging the element in a direction away from the knife, locking means including an arm pivotally mounted on the machine frame operating against the tension of said spring for holding the element in normal position adjacent the knife, said element acting as a slice deflector for deflecting slices downwardly as they are being severed to be deflected downwardly and away from the cutting edge of the knife, and trip means operated by the carriage to trip the locking means and permitting the spring means to move the element away from its normal position adjacent the knife immediately after a slice has been severed and causing the severed slices to be deposited one upon the other in stacked relationship on the tray whereby the element acts also as a slice stacker, said trip means including an arm pivotally mounted on said carriage.

2. A slicing machine comprising a slicing knife and means to rotate the knife, a carriage mounted on one side of the knife for movement in a rectilinear path across the slicing plane of the knife to cut slices from substance on the carriage, a slice receiving tray adjacent the knife, a pivotally mounted deflector and stacker element arranged at the other side of knife and adjacent thereto, spring means normally urging the element in a direction away from the knife, locking means including an arm pivotally mounted on the machine frame operating against the tension of said spring for holding the element in normal position adjacent the knife, said element acting as a slice deflector for deflecting slices as they are being severed to be deflected downwardly away from the cutting edge of the knife, and trip means carried by the carriage to engage said arm and trip the locking means to permit the spring means to move the element on its pivot away from its normal position adjacent the knife immediately after a slice has been severed and causing the severed slices to be deposited one upon the other in stacked relationship on the tray whereby the element acts also as a slice stacker, said trip means including means on said carriage for engaging and moving said arm, a lever pivotally mounted on the carriage intermediate the ends of said lever, latch means for normally maintaining said lever against movement about its pivot, and means for releasing said latch means.

3. A slicing machine comprising a slicing knife and means to rotate the knife, a carriage adapted for movement in a rectilinear path, a deflector shield movably mounted adjacent the knife to support a slice being cut and deflect it away from the knife edge, means for supporting the shield in position adjacent the knife, spring means operatively connected to the shield to move the deflector downwardly to stack slices in a vertical pile, means including an arm pivotally mounted on the frame of said machine for locking said shield against action of said spring means, and means including a second arm pivotally mounted on said carriage for moving said first arm and tripping said spring means.

4. A slicing machine comprising a slicing knife and means to rotate the knife, a carriage adapted for movement in a rectilinear path, a deflector shield movably mounted adjacent the knife to support a slice being cut and deflect it away from the knife edge, means for supporting the shield in position adjacent the knife, spring means operatively connected to the shield to move the deflector downwardly and away from the knife to stack slices vertically, means including an arm pivotally mounted on the frame of said machine for locking said shield against action of said spring means, means including a second arm pivotally mounted on said carriage for moving said first arm and tripping said spring means, and means controlled by the carriage upon return movement of the carriage to return said first and second arms to locking position and to move said shield to normal operative position.

5. A slicing machine comprising a rotary slicing knife and means to rotate said knife, a substance carriage mounted for movement past said knife, a combined deflector member and discharge fly of relatively thin and light weight material arranged adjacent the cutting edge of said knife, said combined deflector and fly having a curved slice deflecting surface extending in a direction angularly outward with respect to said knife and of a generally conical section with respect to the axis of said knife, said curved surface extending throughout substantially the entire width of the deflector and providing for deflecting slices outwardly and at an acute angle away from the slicing plane of the knife during slicing thereof without the intervention of movable slice conveying means, pivot means for said combined deflector and fly member positioned adjacent the lower end of the member, said pivot means being arranged on a substantially horizontal axis inclined away from the cutting edge of the knife at a substantial angle with respect to both the slicing plane of the knife and a perpendicular thereto thereby to provide for swinging the combined deflector and fly member outwardly away from the knife as well as downwardly upon movement of the member about said axis, and means coordinated with operation of said carriage for swinging the combined deflector and fly member about said pivot axis to stack slices in a vertical pile.

6. A slicing machine comprising a rotary slicing knife and means to rotate said knife, a substance carriage mounted for movement past said knife, a combined deflector member and discharge fly of relatively thin and light weight material arranged adjacent the cutting edge of said knife, said combined deflector and fly having a curved slice deflecting surface extending in a direction angularly outward with respect to said knife and of a generally conical section with respect to the axis of said knife, said curved surface extending throughout substantially the entire width of the deflector and providing for deflecting slices outwardly and at an acute angle away from the slicing plane of the knife during slicing thereof without the intervention of movable slice conveying means, a plurality of upstanding ribs on said curved surface extending in the direction of slice movement to guide and assist the movement of slices on the deflector, pivot means for said combined deflector and fly member positioned adjacent the lower end of the member, said pivot means being arranged on a substantially horizontal axis inclined away from the cutting edge of the knife at a substantial angle with respect to both the slicing plane of the knife and a perpendicular thereto thereby to provide for swinging the combined deflector and fly member outwardly away from the knife as well as downwardly upon movement of the member about said axis, and means coordinated with operation of said carriage for swinging the combined deflector and fly member about said pivot axis to stack slices in a vertical pile.

7. A slicing machine comprising a rotary slicing knife and means to rotate said knife, a substance carriage mounted for movement past said knife, a deflector shield movably mounted adjacent the knife to support a slice being cut and deflect it away from the knife edge, means for supporting the shield in position adjacent the knife, spring means operatively connected to the shield to move the deflector downwardly to stack slices in a vertical pile, a first arm pivotally mounted on the frame of said machine, means including a roller normally supported upon the top of said first arm for locking said shield against action of said spring means, means on said carriage for engaging and moving said first arm, a second arm pivotally mounted on the carriage intermediate the ends of the arm and arranged to receive said roller on the upper surface thereof upon said movement of the first arm, latch means for normally maintaining the second arm against movement about its pivot, and means on the said latch means adapted to be engaged by said roller after movement of the roller past the pivot of the second arm for releasing the latch means.

WILLIAM MAHLER.